(12) United States Patent
Zhang (10) Patent No.: US 10,796,689 B2
(45) Date of Patent: Oct. 6, 2020

(54) VOICE PROCESSING METHODS AND ELECTRONIC DEVICES

(71) Applicant: Lenovo (Beijing) Co., Ltd., Beijing (CN)

(72) Inventor: Ya Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 39 days.

(21) Appl. No.: 15/869,338

(22) Filed: Jan. 12, 2018

(65) Prior Publication Data

US 2018/0277105 A1   Sep. 27, 2018

(30) Foreign Application Priority Data

Mar. 24, 2017 (CN) .......................... 2017 1 0186085

(51) Int. Cl.
| | |
|---|---|
| *G10L 15/18* | (2013.01) |
| *G10L 25/60* | (2013.01) |
| *G10L 15/22* | (2006.01) |
| *G10L 15/02* | (2006.01) |
| *G06F 16/9032* | (2019.01) |
| *G10L 17/00* | (2013.01) |
| *G10L 25/90* | (2013.01) |
| *G10L 25/51* | (2013.01) |

(52) U.S. Cl.
CPC .... *G10L 15/1815* (2013.01); *G06F 16/90332* (2019.01); *G10L 15/02* (2013.01); *G10L 15/22* (2013.01); *G10L 25/60* (2013.01); *G10L 17/00* (2013.01); *G10L 17/005* (2013.01); *G10L 25/51* (2013.01); *G10L 25/90* (2013.01); *G10L 2015/223* (2013.01)

(58) Field of Classification Search
CPC ....................................................... G10L 15/22
USPC ........................................................ 704/257
See application file for complete search history.

(56) References Cited

U.S. PATENT DOCUMENTS

| | | | | |
|---|---|---|---|---|
| 8,140,329 B2* | 3/2012 | Zhang | ............ | G10L 25/48 704/231 |
| 2003/0046071 A1* | 3/2003 | Wyman | ............ | G10L 15/22 704/235 |
| 2004/0167767 A1* | 8/2004 | Xiong | ............ | G10L 25/00 704/1 |
| 2012/0059653 A1* | 3/2012 | Adams | ............ | G10L 15/19 704/243 |
| 2014/0222436 A1* | 8/2014 | Binder | ............ | G10L 15/265 704/275 |
| 2014/0236572 A1* | 8/2014 | Meshulam | ......... | G06F 16/3329 704/9 |

(Continued)

FOREIGN PATENT DOCUMENTS

| | | |
|---|---|---|
| CN | 103945062 A | 7/2014 |
| CN | 105334743 A | 2/2016 |

(Continued)

*Primary Examiner* — Huyen X Vo
*Assistant Examiner* — Timothy Nguyen
(74) *Attorney, Agent, or Firm* — Anova Law Group, PLLC (57) ABSTRACT

A method for voice processing includes acquiring sound information, extracting speech information from the sound information, recognizing semantic information of the speech information, obtaining context information, and determining response information based on the semantic information and the context information.

20 Claims, 2 Drawing Sheets

---

Sending a request to acquire response information based on the semantic information and the context information — S201

↓

Receiving the response information — S202

(56) References Cited

U.S. PATENT DOCUMENTS

| | | | | |
|---|---|---|---|---|
| 2014/0278379 A1* | 9/2014 | Coccaro | ............. | G10L 15/1822 |
| | | | | 704/202 |
| 2015/0154492 A1* | 6/2015 | Ponomarev | ............. | H04W 4/70 |
| | | | | 706/11 |
| 2016/0253710 A1* | 9/2016 | Publicover | ............. | H04W 4/21 |
| | | | | 705/14.66 |

FOREIGN PATENT DOCUMENTS

| | | |
|---|---|---|
| CN | 105334782 A | 2/2016 |
| CN | 105654950 A | 6/2016 |
| CN | 106205648 A | 12/2016 |
| CN | 106531162 A | 3/2017 |
| JP | 2016062084 A | 4/2016 |

\* cited by examiner

VOICE PROCESSING METHODS AND ELECTRONIC DEVICES

CROSS-REFERENCES TO RELATED APPLICATION

This application claims priority to Chinese Patent Application No. 201710186085.0, filed on Mar. 24, 2017, the entire contents of which are incorporated herein by reference.

TECHNICAL FIELD

The present disclosure relates to the field of information processing technology and, more particularly, to voice recognition, voice processing methods, and electronic devices.

BACKGROUND

With the improvement of living standards, the demand for smart appliance is also improving. People want to communicate directly with the smart appliance through voice. However, the existing electronic devices sometimes cannot accurately understand the content of human voices. Further, the content of the feedback from the existing electronic devices is too mechanical. That is, the existing electronic devices may lack the responding ability.

SUMMARY

In accordance with the disclosure, there is provided a method for voice processing including acquiring sound information, extracting speech information from the sound information, recognizing semantic information of the speech information, obtaining context information, and determining response information based on the semantic information and the context information.

Also in accordance with the disclosure, there is provided an electronic device including a hardware processor and a memory storing instructions for execution by the hardware processor to acquire sound information, extract speech information from the sound information, recognize semantic information of the speech information, obtain context information, and determine response information based on the semantic information and the context information.

Also in accordance with the disclosure, there is provided a computer-readable storage medium that is not a transitory signal. The computer-readable storage medium stores computer-executable instructions for execution by a hardware processor to acquire sound information, extract speech information from the sound information, recognize semantic information of the speech information, obtain context information, and determine response information based on the semantic information and the context information.

BRIEF DESCRIPTION OF THE DRAWINGS

Various objectives, features, and advantages of the present disclosure can be more fully appreciated with reference to the detailed description of embodiments in connection with the following drawings, in which same reference numerals refer to the same or like elements unless otherwise specified. The following drawings are merely examples for illustrative purposes according to various disclosed embodiments and are not intended to limit the scope of the present disclosure.

DETAILED DESCRIPTION

Embodiments of the disclosure will be described in detail with reference to the accompanying drawings. The following description is made only by way of example, but does not limit the present disclosure. Various embodiments of the present disclosure and various features in the embodiments that do not conflict with each other can be combined and rearranged in various ways. Without departing from the spirit and scope of the present disclosure, modifications, equivalents, or improvements to the present disclosure are conceivable to those skilled in the art and are intended to be encompassed within the scope of the present disclosure.

Voice interaction as a most natural and convenient method of human-computer interaction is the foundation of many other applications, such as voice dialing, voice navigation, indoor appliance control, etc. The goal of voice interaction is to convert the content expressed by human speech into computer-readable input information, such as keys, binary encodings, or sequence of characters.

However, the existing speech recognition and machine dialogue have a poor user experience. The main reason is that the semantic expression in human dialogue is only a part of the information. The dialogue context can also be used for the expression of information. In other words, human dialogue may be diversified depending on the context.

In accordance with various embodiments, the present disclosure provides voice processing methods, and electronic devices for implementing the voice processing methods.

Figure 1:
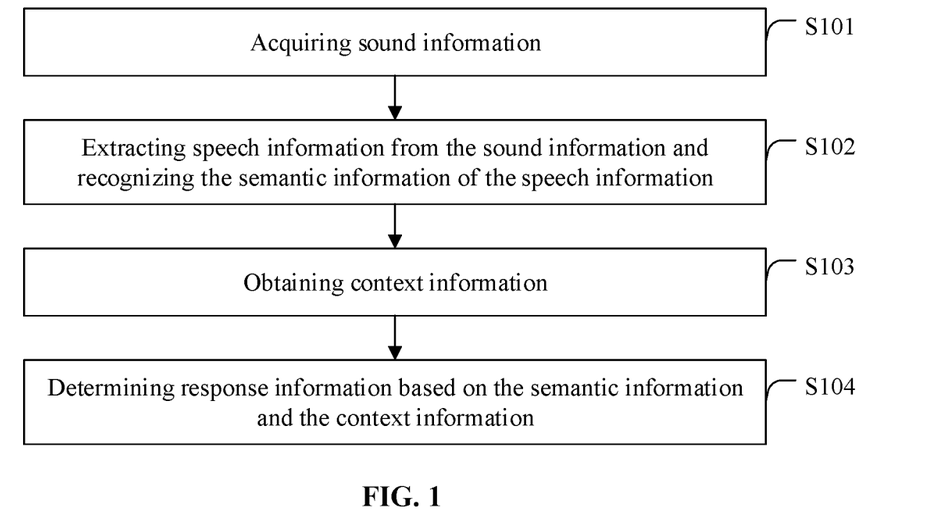
FIG. 1 illustrates a schematic flow diagram of an example of method for voice processing in accordance with the present disclosure.

FIG. 1 illustrates a schematic flow diagram of an example of method for voice processing in accordance with the present disclosure.

As shown, the method for voice processing includes acquiring sound information at S101, extracting speech information from the sound information and recognizing the semantic information of the speech information at S102, obtaining context information at S103, and determining response information based on the semantic information and the context information.

The disclosed method for voice processing can combine the speech information and the context information to make diversified responses to different sound information. Thus, the disclosed method for voice processing can be more in line with the human habit, thereby enhancing the user experience.

At S101, the sound information is acquired. For example, the sound information can be acquired by using a sound collecting device.

At S102, the speech information is extracted from the sound information, and the semantic information of the speech information is recognized. The sound information may contain the speech information and other sounds. The speech information can be extracted, and then be recognized to obtain the semantic information. When the sound information does not contain speech information, the result of obtaining the semantic information can be empty.

At S103, the context information is obtained. The context information can indicate information about the current scenario. There can be many forms of context information, examples of which are described below. It is to be noted that these examples are not to be treated as a limitation of the present disclosure.

In some embodiments, the context information can include time information, such as one or more of year, month, day, hour, minute, second, season, work day/rest day, morning/afternoon, constellation, Heavenly stem and Earthly branch, etc.

In some embodiments, the context information can include location information, such as longitude, latitude, country, city, area, street, room, etc.

In some embodiments, the context information can include weather information, such as raining, sunning, snowing, clouding, air temperature, air humidity, atmospheric pressure, UV intensity, and/or air pollution, etc.

In some embodiments, the context information can include user information, such as name, gender, age, place of origin, work situation, behavior, schedule, and or physical condition, etc.

In some embodiments, the context information can also include other information in the current scenario, such as the user's current mood, whether there are other people present, and/or status of other devices, etc.

The context information described above can be obtained by using any suitable method. Three methods are described as examples below, which are not intended to limit the present disclosure. In the specific implementation, the three methods can be used selectively, or can be used as a combination.

(1) Receiving the Context Information.

The context information may be obtained from other devices, such as clocks, positioning devices, one or more servers that contain relevant information, etc. The context information obtained at S103 may be received from other devices.

In some embodiments, the context information may be received from another device by using any suitable communication protocol, such as Wi-Fi (e.g., 802.11 protocol), Ethernet, Bluetooth™, high frequency systems (e.g., 900 MHz, 2.4 GHz, and 5.6 GHz communication systems), cellular networks (e.g., GSM, AMPS, GPRS, CDMA, EV-DO, EDGE, 3GSM, DECT, IS-136/TDMA, iDen, LTE), infrared, Transmission Control Protocol/Internet Protocol (TCP/IP, such as any protocol used in any TCP/IP layer), Hypertext Transfer Protocol (HTTP), BitTorrent™, File Transfer Protocol (FTP), Real-Time Transport Protocol (RTP), Real-Time Streaming Protocol (RTSP), Secure Shell Protocol (SSH), Voice over Internet Protocol (VOIP), or any combination thereof.

In some embodiments, the context information may be received by enabling the electronic device to be electrically coupled to and communicate with another device (e.g., a computer or an accessory device) over a wireless or wired connection.

In some embodiments, the context information can be obtained through user input. Using a certain input unit, such as a voice input unit, a user can directly enter some context information. As such, the context information can be obtained through user input.

Compared with the context information obtained through other methods, the context information directly received can be more accurate, and thus accurate response information can be more easily obtained.

(2) Processing the Speech Information to Obtain the Context Information.

The context information can be partially or completely obtained by processing the speech information extracted from the sound information at S102. Two examples are described below, and are not intended to limit the present disclosure. In the specific implementation, the two examples can be used selectively, or can be used as a combination.

A. Processing the Speech Information to Obtain Sound Quality Information, and Obtaining the Context Information Based on the Sound Quality Information.

The sound quality information can include pitch information, loudness information, and timbre information. In some embodiments, one or more of the pitch information, loudness information, and the timbre information may be analyzed to obtain the context information.

For example, in general, when a user is talking, the pitch of the user may not change much. When the user is singing, the pitch of the user may change more often. As such, according to the change of the pitch, it can be determined that whether the user is singing or talking. That is, the context information can be determined by analyzing the pitch information.

As another example, when a user is in different moods, the pitch and loudness of the user may be different. When the user's mood is low, the pitch and the loudness of the user may be also low, and/or the loudness may rise suddenly. When the user's mood is high, the pitch and loudness may have different features. By combining the pitch information and the loudness information, the user's emotion can be determined to a certain degree. That is, the context information can be determined by analyzing the pitch information and the loudness information.

As yet another example, by combining the pitch information, loudness information, and the timbre information, some of the characteristics of the user, such as user's age, gender, etc., may be determined. That is, the context information can be determined by analyzing the pitch information, loudness information, and the timbre information.

Accordingly, based on the sound quality information, the context information including the user's age, gender, current emotions, etc. can be obtained timely and flexibly.

B. Processing the Speech Information to Obtain Voiceprint Information, and Obtaining the Context Information Based on the Voiceprint Information.

The voiceprint information can more accurately identify the user's identity. In some embodiments, the main body of the speech information can be identified based on the voiceprint information. For example, Zhang San said a sentence (speech information A) and Li Si said a sentence (speech information B). In this scenario, the main body of the speech information A is Zhang San, and the main body of the speech information B is Li Si. Such information can be the context information.

Accordingly, based on the voiceprint information, the user identity can be accurately and reliably determined.

(3) Processing Information Other than the Speech Information in the Sound Information to Obtain the Context Information.

For example, the information other than the speech information in the sound information can include music, radio, noisy sounds on the street, alarm sounds, animal sounds, or any other environmental sound.

By analyzing the speech information and/or the information other than the speech information, the context information associated with the user can be obtained without an input process. Thus, the process can be convenient and timely, and the obtained context information can be accurate.

At S104, the response information can be determined based on the semantic information and the context information.

In some embodiments, the response information may include voice response information. The semantics of the voice response information can be associated with the context information.

Each piece of semantic information may be associated with one or more pieces of context information. In some embodiments, multiple pieces of context information may be acquired at the same time, or may be acquired by multiple times as needed. Several scenarios are described below as examples.

Scenario 1:

A user is in the bedroom, a smart rice cooker including a communicator is cooking in the kitchen. In response to receiving the voice message "Is the rice ready?" from the user, it can be determined whether context information is received from the smart rice cooker. Assuming the context information indicates that the rice cooker is still cooking, and will automatically stop in two minutes when the cooking finishes. Based on the semantic information "Is the rice ready?" and the context information "Not yet, anticipated to finish in two minutes," the response information can be determined as "Hold on, please wait for two more minutes."

Scenario 2:

A voice message that "What is the schedule of my little cat tomorrow?" is received from a user. A first piece of acquired context information including the user habits indicates that "little cat" is the nickname of the user's daughter. Accordingly, it can be determined that the user is asking for tomorrow's schedule of the user's youngest daughter. A second piece of context information can be obtained, e.g., from a user input schedule, which records that the user's daughter has a piano lesson during 14:00-16:00 tomorrow. Therefore, based on the above context information and the semantic information, the response information can be determined as "Little cat has a piano lesson from 14:00-16:00 tomorrow."

Scenario 3:

A voice message of "Lu Xing Gu Li Nai Ge Zou" is received from a user. A first piece of acquired context information indicates that the user is from Shaoxing, and speaks a local dialect. Therefore, the semantic information can be adjusted to "Lu Xun Gu Li Zen Me Zou?" (meaning "How do I go to Lu Xun's hometown?"). A second piece of context information including a current geographical location of the user and a geographical location of Lu Xun's hometown can be obtained. Accordingly, based on the above context information and the semantic information, the response information can be determined to include a recommended route or navigation information for the user.

Scenario 4:

A voice message of "I do not want to eat" is received from a user. According to the sound quality characteristics of the voice message, a piece of obtained context information includes that the user may be angry, the user is likely to speak an irony when the user is angry, and the user may need comfort. Therefore, the user's preferences information can be accessed. The obtained preferences information indicates that the user likes to eat strawberries, and a box of strawberry is in the smart fridge. Accordingly, based on the above context information and the semantic information, the response information can be determined as "My dear, would you like some strawberries, there are some in the fridge."

Scenario 5:

A piece of speech information is extracted from a piece of received sound information. In the process of recognizing the semantic information from the speech information, it is found that the speech information contains a private keyword. In this case, it can be determined whether the user has an authority to obtain the relevant response by processing the speech information. In addition, it can be determined whether any other person having a relevant authority is present by processing other information other than the speech information, such as a voice of different voiceprint that appears simultaneously, or whether a voice of different voiceprint appears within a certain time range, etc. The obtained context information can be used to determine whether to provide a response relative to or irrelative to the private keyword.

Scenario 6:

A voice message "Any recommendation for entertainment nearby during this weekend with a 500 budget?" is received from a user. The obtained context information can include time information (date, season, etc.), location information (location of the user, locations of the surrounding attractions, etc.), weather information (weather conditions during the weekend, pollution conditions, etc.), traffic conditions, user's preferences, attractions evaluation information, events information, and so on. Accordingly, based on the above context information and the semantic information, the response information can include one or more recommended plans for the user.

In some embodiments, the response information may include voice response information. The sound quality of the voice response information is associated with the context information.

For example, when the context information indicates that the user is an adult who prefers simple and concise responses, the voice response information may contain only necessary information, and a clear and stable sound quality can be selected. As such, the response information can be more refined and better conform to the user's habit. When the context information indicates that the user is a child, the tone of the voice response information can be cheerful and rich of cadence; the sound can be children's voice or female voice, and the semantic part can be visual, making the response information vivid and meeting requirements of child education.

As another example, when a user wishes that the respond information is to play a song, and the context information contains the user's mood or the user's identity corresponding to the preferences, the response information can be selected from multiple songs with different sound qualities and semantics based on the above information.

Consistent with the disclosure, the sound quality and/or semantics of the voice response information can be associated with the context information, such that the form and content of the voice response information can be in line with the current scenario. Therefore, the stiffness of the computer response may be overcome to a certain degree, and the user experience in the human-computer voice interaction can be improved.

Figure 2:
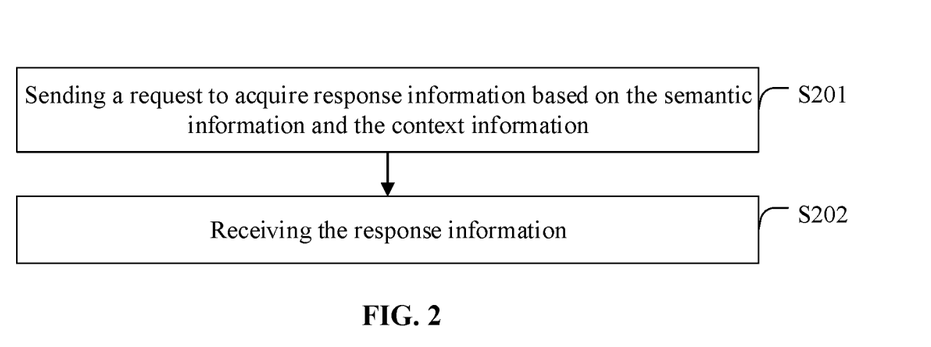
FIG. 2 illustrates a schematic flow diagram of an example of method for determining response information based on semantic information and context information in accordance with the present disclosure.

FIG. 2 illustrates a schematic flow diagram of an example of method for determining response information based on semantic information and context information in accordance with the present disclosure. As shown in FIG. 2, the method includes sending a request to acquire response information based on the semantic information and the context information at S201, and receiving the response information at S202.

Sending the request to acquire response information and receiving the response information can be realized by using any suitable communication protocol. For example, in some embodiments, a request to acquire response information may be sent by a local electronic device to a personal computer via Wi-Fi. The personal computer can transmit the request over the Internet to a cloud server. The cloud server can process the request, determine the response information, and send the response information over the Internet to the personal computer. The personal computer can receive the response information, and transmit the response information through Wi-Fi to the local electronic device.

According to the method shown in FIG. 2, a portion for receiving sound and a portion for analyzing semantic information and context information can be separated. As such, it may be easier to implement the portion for receiving sound.

Another aspect of the present disclosure provides an electronic device for voice processing. The electronic device can include a processor and a memory. The memory stores instructions for execution by the processor to acquire sound information, extract speech information from the sound information and recognize the semantic information of the speech information, obtain context information, and determine response information based on the semantic information and the context information.

The disclosed electronic device for voice processing can combine the speech information and the context information to produce diversified responses to different sound information. Thus, the disclosed electronic device for voice processing can be more in line with the human habit, thereby enhancing the user experience.

In some embodiments, the electronic device can acquire the sound information by using a sound collecting device. The processor of the electronic device can extract the speech information from the sound information and identify the semantic information of the speech information. The sound information may contain speech information and other sounds. The processor of the electronic device can identify the content of the speech information to obtain the semantic information. When the sound information does not contain speech information, the result of obtaining the semantic information can be empty.

The electronic device can obtain various context information as described above in connection with FIG. 1. The context information can be obtained by using any suitable method. Three methods are described as examples below, and are not intended to limit the present disclosure. In the specific implementation, the three methods can be used selectively, or can be used as a combination.

(1) Receiving the Context Information.

The electronic device can include a communicator. By using any suitable communication protocol, such as those described above in connection with FIG. 1, the communicator can receive context information from another device, such as a clock, a positioning device, one or more servers that contain relevant information, etc. In some embodiments, the other device may be built into the first electronic device as part of the first electronic device.

In some embodiments, the context information can be obtained through user input. Using a certain input unit, such as a voice input unit, a user can directly enter some context information. As such, the context information can be obtained through user input.

Compared with the context information obtained through other methods, the context information directly received can be more accurate, and thus accurate response information can be more easily obtained.

(2) Processing the Speech Information to Obtain the Context Information.

The processor can process the speech information extracted from the sound information to obtain part of the context information or the entire context information. Two examples are described below, and are not intended to limit the present disclosure. In the specific implementation, the two examples can be used selectively, or can be used as a combination.

A. Processing the Speech Information to Obtain Sound Quality Information, and Obtaining the Context Information Based on the Sound Quality Information.

In some embodiments, the processor can include a sound quality analyzing circuit. The sound quality analyzing circuit can analyze one or more of pitch information, loudness information, and timbre information in the speech information to obtain the context information.

Based on the sound quality information, the context information including the user's age, gender, current emotions, etc. can be obtained timely and flexibly.

B. Processing the Speech Information to Obtain Voiceprint Information, and Obtaining the Context Information Based on the Voiceprint Information.

In some embodiments, the processor can include a voiceprint processing circuit. The voiceprint processing circuit can process the voiceprint information to accurately identify the user's identity.

(3) Processing Information Other than the Speech Information in the Sound Information to Obtain the Context Information.

By analyzing the speech information and/or the information other than the speech information, the context information associated with the user can be obtained without an input process. Thus, the process can be convenient and timely, and the obtained context information can be accurate.

After obtaining the context information, the processor can determine the response information based on the semantic information and the context information.

In some embodiments, the response information may include voice response information. The semantics of the voice response information can be associated with the context information.

Each piece of semantic information may be associated with one or more pieces of context information. In some embodiments, multiple pieces of context information may be acquired at the same time, or may be acquired by multiple times as needed.

The methods described above in connection with FIG. 1 can be referred to for details of obtaining the response information by the processor based on the semantic information and context information, and thus the description thereof can be omitted.

The sound quality and/or semantics of the voice response information can be associated with the context information, such that the form and content of the voice response information can be in line with the current scenario. Therefore, the stiffness of the computer response may be overcome to a certain degree, and the user experience in the human-computer voice interaction can be improved.

In some embodiments, the response information may include any suitable type of information, such as text, pictures, videos, etc. The response information can be presented on a display screen.

In some embodiments, determining the response information based on the semantic information and the context information may further includes sending a request to acquire the response information and receiving the response information.

Sending the request to acquire the response information and receiving the response information can be realized by the communicator and any suitable communication protocol, such as one of those described above in connection with FIG. 1. As such, a large amount of processing work of the electronic device may be avoided. The work of determining the response information can be processed by a remote electronic device, such that the electronic device can have a simple structure and a reduced cost.

Figure 3:
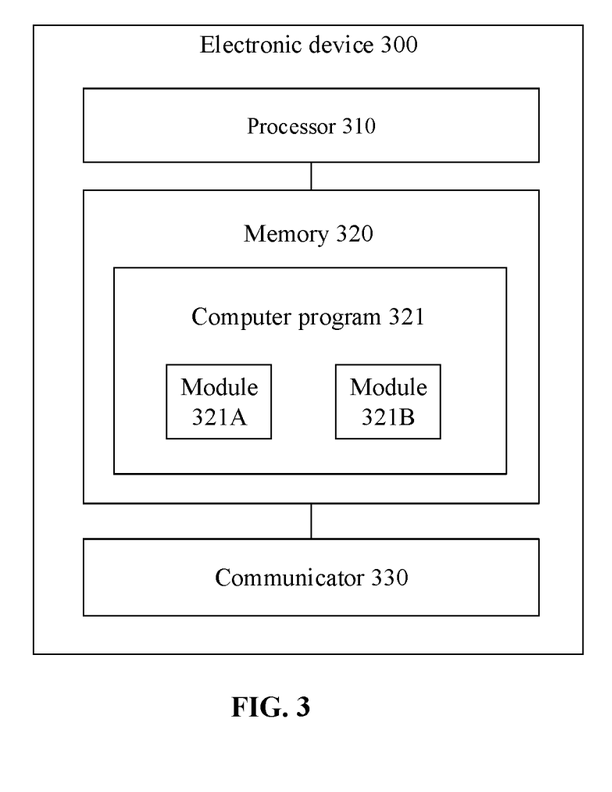
FIG. 3 illustrates a schematic structure diagram of an example of electronic device for voice processing in accordance with the present disclosure.

FIG. 3 illustrates a schematic structure diagram of an example of electronic device for voice processing in accordance with the present disclosure.

As shown in FIG. 3, the electronic device 300 includes a processor 310, a memory 320, and a communicator 330. The electronic device 300 may perform a method consistent with the disclosure, such as one of the methods described above with reference to FIGS. 1 and 2, to enable a flexible response to the sound information in accordance with current context.

The processor 310 may include any suitable hardware processor, such as a general purpose microprocessor, an instruction set processor, and/or a related chipset and/or a dedicated microprocessor (e.g., application specific integrated circuit (ASIC)), etc. The processor 310 may also include onboard memory for buffering purposes. The processor 310 may include a single processing unit or a plurality of processing units for performing different processes according to the methods described with reference to FIGS. 1 and 2.

The memory 320 can include a computer-readable storage medium (e.g., that is not a transitory signal), such as any medium capable of containing, storing, transferring, communicating, or transmitting instructions. For example, a readable storage medium may include, but is not limited to, an electrical, magnetic, optical, electromagnetic, infrared, or semiconductor system, apparatus, device, or communication media. Specific examples of the computer-readable storage medium can include a magnetic storage device such as a magnetic tape or a hard disk drive (HDD), an optical storage devices such as a compact disc read-only memory (CD-ROM) or digital versatile disc (DVD), a storage device such as a random access memory (RAM), read-only memory (ROM), electrically erasable programmable read-only memory (EEPROM), or flash memory, and/or a wired/wireless communication link, etc.

The computer readable storage medium may include a computer program 321 that may include code/computer executable instructions for execution by the processor 310 to perform a method consistent with the disclosure, such as one of the methods described above in connection with FIGS. 1 and 2, and/or any modification thereof.

The computer program 321 may be configured to have computer program codes including a computer program module. For example, in some embodiments, the codes in the computer program 321 may include one or more program modules including module 321A, module 321B, etc. It is noted that the division and number of modules may not be fixed. Those skilled in the art can use any suitable program modules and/or combinations thereof according to the actual situation. When the program modules and/or combinations are executed by the processor 310, the processor 310 can perform a method consistent with the disclosure, such as one of the methods described above in connection with FIGS. 1 and 2 or any variation thereof.

In some embodiments, the processor 310 may interact with the communicator 330 to perform the method consistent with the disclosure, such as one of the methods described above in connection with FIGS. 1 and 2 or any variation thereof.

The provision of the examples described herein (as well as clauses phrased as "such as," "e.g.," "including," or the like) should not be interpreted as limiting the disclosure to the specific examples; rather, the examples are intended to illustrate only some of many possible aspects.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure. Features of the disclosed embodiments can be combined and rearranged in various ways. Without departing from the spirit and scope of the present disclosure, modifications, equivalents, or improvements to the present disclosure are conceivable to those skilled in the art and are intended to be encompassed within the scope of the present disclosure.

What is claimed is:

1. A method for voice processing comprising:
   acquiring, by a processor, sound information from a user;
   extracting, by the processor, speech information from the sound information;
   recognizing, by the processor, semantic information of the speech information by determining whether the speech information contains a private keyword;
   obtaining, by the processor, context information that indicates a current scenario, the context information including a mood of the user, whether there is a person other than the user present that has a relevant authority to obtain response information, and a status of another device;
   determining, by the processor based on the semantic information and the context information indicating the presence of a person other than the user having the relevant authority to obtain the response information relative to or irrelative to the private keyword, the response information configured to respond to the sound information of the user, the response information including voice response information, including:
   determining, by the processor based on the semantic information and the context information, sound quality characteristics of the voice response information, the sound quality characteristics including gender and age of a sound that is suitable for presenting the voice response information to the user; and
   controlling, by the processor, to present the response information to the user using the sound having the determined sound quality characteristics.

2. The method of claim 1, wherein obtaining the context information includes:
   receiving the context information from an electronic device.

3. The method of claim 1, wherein obtaining the context information includes:
   receiving the context information from a user input.

4. The method of claim 1, wherein obtaining the context information includes:
 processing the speech information to obtain the context information.

5. The method of claim 4, wherein processing the speech information to obtain the context information includes:
 processing the speech information to obtain sound quality information; and
 obtaining the context information based on the sound quality information.

6. The method of claim 4, wherein processing the speech information to obtain the context information includes:
 processing the speech information to obtain voiceprint information; and
 obtaining the context information based on the voiceprint information.

7. The method of claim 1, wherein obtaining the context information includes:
 processing information other than the speech information in the sound information to obtain the context information.

8. The method of claim 1, wherein:
 semantics of the voice response information is associated with the context information.

9. The method of claim 1, wherein determining the response information based on the semantic information and the context information includes:
 sending a request for acquiring the response information based on the semantic information and the context information; and
 receiving the response information.

10. An electronic device comprising:
 a hardware processor; and
 a memory storing instructions for execution by the hardware processor to:
  acquire sound information from a user;
  extract speech information from the sound information;
  recognize semantic information of the speech information by determining whether the speech information contains a private keyword;
  obtain context information that indicates a current scenario, the context information including a mood of the user, whether there is a person other than the user present that has a relevant authority to obtain response information, and a status of another device;
  determine, based on the semantic information and the context information indicating the presence of a person other than the user having the relevant authority to obtain the response information relative to or irrelative to the private keyword, the response information configured to respond to the sound information of the user, the response information including voice response information, wherein the hardware processor further executes the instructions to:
  determine, based on the semantic information and the context information, sound quality characteristics of the voice response information, the sound quality characteristics including gender and age of a sound that is suitable for presenting the voice response information to the user; and
  control to present the response information to the user using the sound having the determined sound quality characteristics.

11. The electronic device of claim 10, wherein the hardware processor further executes the instructions to:
 receive the context information from another electronic device.

12. The electronic device of claim 10, wherein the hardware processor further executes the instructions to:
 receive the context information from a user input.

13. The electronic device of claim 10, wherein the hardware processor further executes the instructions to:
 process the speech information to obtain the context information.

14. The electronic device of claim 13, wherein the hardware processor further executes the instructions to:
 process the speech information to obtain sound quality information; and
 obtain the context information based on the sound quality information.

15. The electronic device of claim 13, wherein the hardware processor further executes the instructions to:
 process the speech information to obtain voiceprint information; and
 obtain the context information based on the voiceprint information.

16. The electronic device of claim 10, wherein the hardware processor further executes the instructions to:
 process information other than the speech information in the sound information to obtain the context information.

17. The electronic device of claim 10, wherein:
 semantics of the voice response information is associated with the context information.

18. The electronic device of claim 10, wherein the hardware processor further executes the instructions to:
 send a request for acquiring the response information based on the semantic information and the context information; and
 receive the response information.

19. A computer-readable storage medium that is not a transitory signal, the computer-readable storage medium storing computer-executable instructions for execution by a hardware processor to:
 acquire sound information from a user;
 extract speech information from the sound information;
 recognize semantic information of the speech information by determining whether the speech information contains a private keyword;
 obtain context information that indicates a current scenario, the context information including a mood of the user, whether there is a person other than the user present that has a relevant authority to obtain response information, and a status of another device;
 determine, based on the semantic information and the context information indicating the presence of a person other than the user having the relevant authority to obtain the response information relative to or irrelative to the private keyword, the response information configured to respond to the sound information of the user, the response information including voice response information, wherein the hardware processor is further configured to:
 determine, based on the semantic information and the context information, sound quality characteristics of the voice response information, the sound quality characteristics including gender and age of a sound that is suitable for presenting the voice response information to the user; and
 control to present the response information to the user using the sound having the determined sound quality characteristics.

20. The storage medium of claim 19, further storing computer-executable instructions for execution by the hardware processor to perform at least one selected from the group consisting of:
    receiving the context information from at least one consisting of an electronic device and a user input;
    processing the speech information to obtain the context information; and
    processing information other than the speech information in the sound information to obtain the context information.

\* \* \* \* \*